United States Patent
Nicotera

(12) 
(10) Patent No.: US 6,421,586 B1
(45) Date of Patent: Jul. 16, 2002

(54) VEHICLE TRACKING AND AUDITING SYSTEM AND METHOD

(76) Inventor: Frank Nicotera, P.O. Box 47196, Tampa, FL (US) 33647

(*) Notice: Subject to any disclaimer, the term of this patent is extended or adjusted under 35 U.S.C. 154(b) by 0 days.

(21) Appl. No.: 09/681,956

(22) Filed: Jun. 29, 2001

(51) Int. Cl.[7] .................................................. G06F 7/00
(52) U.S. Cl. ........................................................... 701/1
(58) Field of Search ............................. 701/1; 235/375, 235/384, 385

(56) References Cited

U.S. PATENT DOCUMENTS

| | | |
|---|---|---|
| 4,141,078 A | 2/1979 | Bridges, Jr. et al. |
| 4,839,875 A | 6/1989 | Kuriyama et al. |
| 5,005,125 A | 4/1991 | Farrar et al. |
| 5,649,115 A | 7/1997 | Schrader et al. |
| 5,770,844 A | 6/1998 | Henn |
| 5,777,884 A | 7/1998 | Belka et al. |
| 5,940,835 A | 8/1999 | Sit |
| 5,949,049 A | 9/1999 | McCarrick et al. |

OTHER PUBLICATIONS

Strand/Ware's BackTrack Handles Equipment Tracking and Maintenance; http://www.barcodebook.com; May 11, 2001.
Calculate Potential Annual Savings; http://www.barcodebook.com; May 11, 2001.
Earth–Moving Machines; http://encarta.msn.com; May 10, 2001.
Roadway Engineering; http://encarta.msn.com; May 10, 2001.
Taking Sides; http://www.pitandquarry.com; May 11, 2001.
Bar Codes do the dirt(y) work for Boston's big dig; http://www.manufacturing.net; May 21, 2001.
The Ins and Outs of Portable Applications; http://www.videx.com; May 15, 2001.
DuraTrax Information; http://www.videx.com; May 15, 2001.
What is an iButton?; http://www.ibutton.com; May 15, 2001.

Primary Examiner—Yonel Beaulieu
(74) Attorney, Agent, or Firm—Anton J. Hopen; Smith & Hopen, P.A.

(57) ABSTRACT

A vehicle tracking and auditing system for construction projects creates electronically stored records used in the invoicing and auditing procedures of a construction project. A unique preprogrammed identification code contained within a touch button memory chip is affixed to a vehicle. A dual function scanner is used to create a record of the vehicle arriving or leaving a designated area by reading an encrypted bar coded load ticket and then reading the touch button affixed to the vehicle. The scanner stamps a time and date associated with each record. The records are electronically stored in the scanner until the records are downloaded to a host computer through a base station. Computer software queries the records into desired reports and invoices. Exemplary reports detail when a vehicle arrived or left a designated area, summarize the total volume of construction material carried by company or by a specific vehicle, route time of the vehicle, and identify potential fraud.

13 Claims, 2 Drawing Sheets

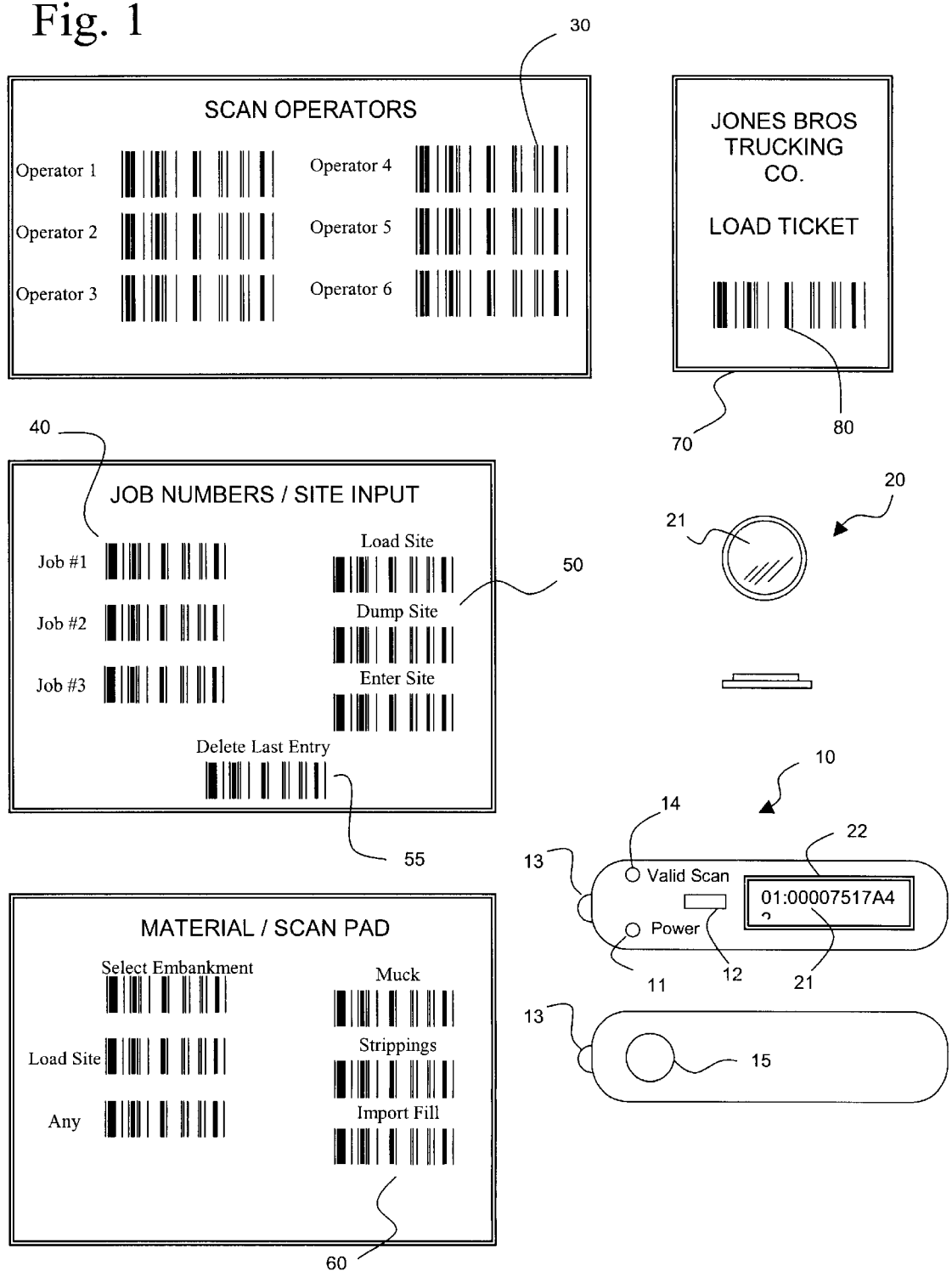

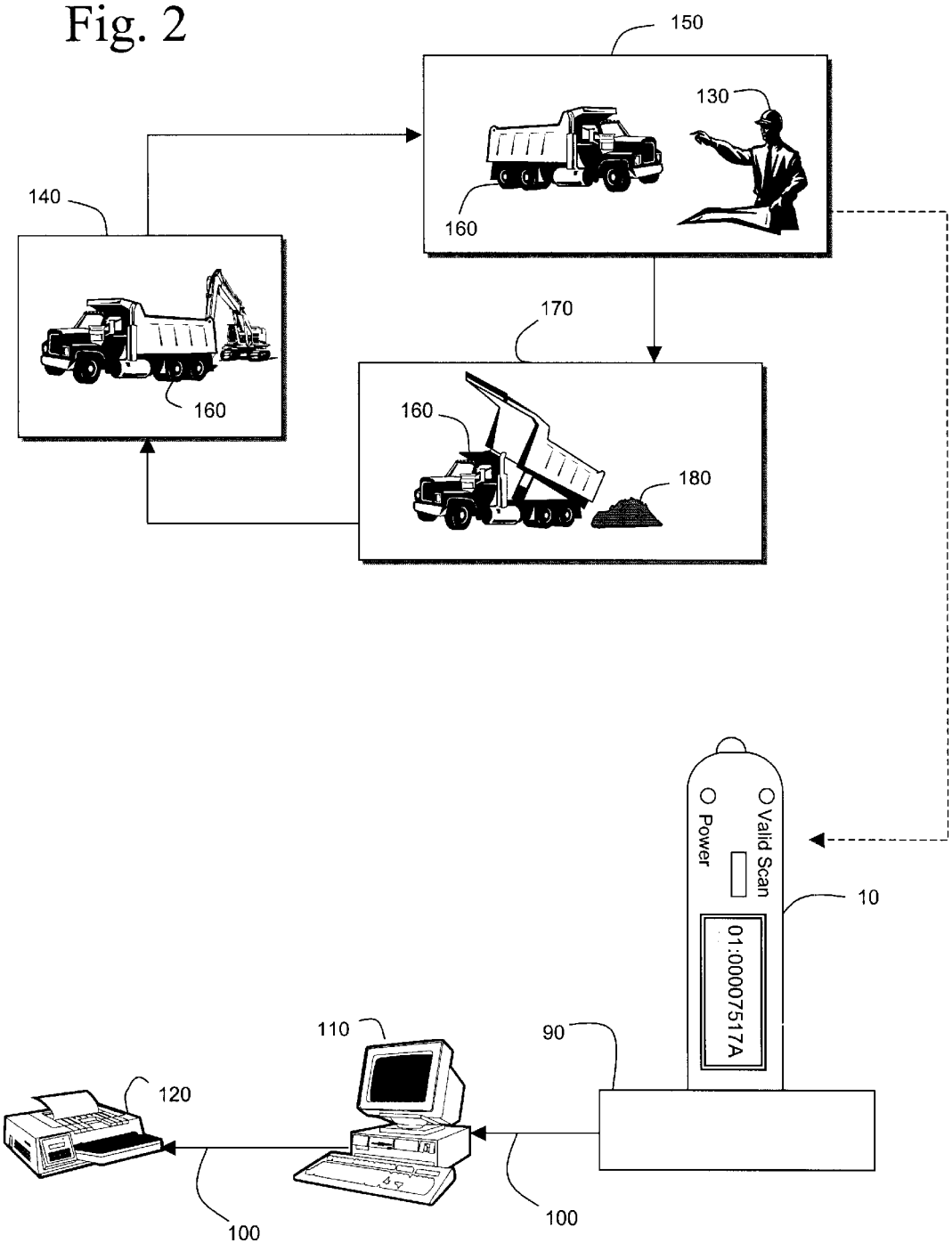

VEHICLE TRACKING AND AUDITING SYSTEM AND METHOD

BACKGROUND OF INVENTION

1. Field of Invention

This invention relates to a vehicle tracking and auditing system for construction projects, and more particularly, a method for tracking vehicles carrying construction materials by creating electronically stored records that can be used in the invoicing and auditing procedures of a construction project.

2. Background of the Invention

Construction projects often involve significant amounts of construction material being hauled to and from the construction site. Typical construction materials that are hauled by trucks include fill material, asphalt, aggregate, or concrete. During the construction of a large project there are numerous trucks on site.

A project may require hundreds of thousands of cubic yards of fill material to be used in the construction of the project. The fill material is hauled by dump trucks to the project site. With each dump truck having a typical eighteen cubic yard capacity, the number of individual daily hauling trips made by each dump truck is significant on a project that requires hundreds of thousands of cubic yards. Thus, over the course of a project the number of hauling trips can be in the thousands for each dump truck.

The current invoicing and auditing practice in the construction industry is based on a three-ticket system for tracking the number of hauling trips made by a truck and invoicing the quantity of construction material based on the hauling trips. The three-ticket system, and variations, works substantially the same way in that when the dump truck arrives at the construction site, the truck driver making the hauling trip issues the first ticket to a contractor on the construction site. The second ticket is issued to the trucking company and the truck driver will keep the third ticket. A total of three tickets are used for the invoicing and auditing of each and every hauling trip. The trucking company invoices the contractor for the fill material based on the number of hauling trips documented by the tickets the trucking company received by the truck driver. The contractor will match the tickets that the trucking company has provided with the tickets that the truck driver upon arrival at the construction site gave them.

The foregoing was for just one dump truck. The number of tickets multiplies by the number of trips that can be made by one dump truck on a daily basis over the life of a project that lasts for months. That number of tickets is multiplied by the number of different trucks of a trucking company involved in the project. Multiply that number of tickets by the total number of hauling trips made by one trucking company by the total of all the trucking companies on a construction project and the number of tickets involved is practically unmanageable. Office staff spends hours entering the information for inventory and billing purposes.

The ticket system has been used not only for the invoicing procedure but also for estimating the quantities of construction material used on a site during the construction process. This is important for estimating and scheduling the requirements of additional construction material that may be needed during the construction or used as a basis for future construction projects. Thus, correct invoicing of the hauling trips completed by the dump trucks is important from a financial standpoint, and from the standpoint of construction, where the total amount of material used is a function of the efficiency of the construction.

The opportunity for inaccurate invoicing and fraud also exists by the truck driver or trucking company. More than one ticket may be submitted to the contractor or the trucking company for only one hauling trip, either by accident or fraudulently. This results in the invoicing to the contractor based on tickets for hauling construction material that never occurred. Also, estimating the needed quantity of future fill material will not be based on accurate information further resulting in delay and scheduling problems. Construction companies have increased costs due to excessive key entry by clerical staff and lost time to resolve inconsistencies in the invoices.

In summary, previous attempts for tracking construction vehicles have not provided a simple and easy to use mechanism that is customized to prevent fraud and eliminate the need for tickets within the construction industry.

Bar coding systems have been developed to use a printed pattern of lines or bars to identify inventory, mail, videocassettes, books, packages, customer accounts, and the like. Bar codes can be read by optically scanning the printed pattern of lines or bars. The scanner has an encoded computer program that can decipher the bar code pattern. The bar code represents a string of numbers or letters that can be associated with the desired data. The common Universal Product Symbol uses a set of four bars of differing widths in pair groupings to represent alphanumeric characters.

Generally, the prior art bar code scanner systems involve tracking inventory through scanning a bar code physically attached to the inventory. Once the inventory is scanned, a person can verify the inventory count by scanning the inventory a second time or by physically counting the inventory. Prior art inventory systems provide no control over scanning the identical item more than once either by error or through fraud, thus providing an inaccurate inventory count of that item.

There are numerous tracking devices available on the market today for tracking many different types of items. Continuing efforts are being made to improve tracking devices and tracking systems. By way of example, note U.S. Pat. No. 5,777,884 to Belka et al. and U.S. Pat. No. 4,141,078 to Bridges, Jr. et al. that disclose an article inventory tracking and control system that assigns a unique barcode to an article and to a user identification card. A processor is used to authenticate both the user and the article and the processor then determines whether to authorize the desired transaction, e.g., check out a library book or videocassette. The Belka et al. and Bridges, Jr. et al. patents are typical examples of the use of tracking devices.

Other tracking systems that use bar code scanners have not developed the means to address the particular problems with tracking materials arriving and leaving a construction site where there is no computer available. Typical construction materials that are hauled by trucks are fill material, asphalt, aggregate, or concrete, although other materials may be used in a construction project. A portable scanner is needed that is durable enough to survive not only all weather conditions at the construction site, but also frequent drops and tough treatment. The scanner must resist moisture and dust, and work reliably in a wide range of temperatures.

Notwithstanding the existence of such prior art tracking systems, there is a need for an improved and more efficient system for the tracking and auditing of vehicles hauling construction materials. Unlike the inventory control tracking systems of Belka et al. and Bridges, Jr. et al. and other similar tracking systems, construction material once incorporated into a construction project, cannot be tracked.

It is, therefore, to the effective resolution of the aforementioned problems and shortcomings of the prior art that the present invention is directed.

Accordingly, what is needed in the art is a tracking system designed specifically for the tracking of construction material hauled by vehicles. More particularly, there is a need for a means that enables a contractor, trucking company, or quarry owner using custom database technology to accurately and efficiently track the construction material arriving or leaving the construction site and also generate all of the desired reports and invoices at the touch of a few buttons, thus eliminating the three-part ticketing system.

However, in view of the prior art at the time the present invention was made, it was not obvious to those of ordinary skill in the pertinent art how the identified needs could be fulfilled.

SUMMARY OF THE INVENTION

The present invention includes a novel, useful, and non-obvious vehicle tracking and auditing system for tracking vehicles carrying construction materials. A vehicle identification means affixed to the vehicle, a sensing means, an operator identifying means, a construction activity identification means, a job number identification means, a construction material identification means, a load ticket identification means, a storing means, a downloading means, a computer means, and a report and invoice generating means for processing the stored data. The key to successfully utilizing a tracking and auditing system for tracking construction materials in an efficient manner is to ensure that an accurate compilation of the hauling trips are documented without the introduction of the opportunity for fraud or inconsistency.

The tracking system of the present invention has several embodiments. One embodiment enables a general contractor to track the construction activity of sub-contractors that haul material onto or away from a construction site. The advantages of the contractor tracking system are that the system eliminates the ticket matching in the office, prevents independent drivers from duplicating and using fraudulent tickets, produces timely reports with extensive detail each day, determines haul times of the construction vehicles for increased productivity, establishes precedence and control for material entering and leaving a construction site, eliminates the requirement to return any tickets to the contractor's office after distribution, and quickly audits billing from the same sub-contractors, thereby increasing accounting productivity.

Another embodiment of the present tracking system enables trucking companies to track both ticket routing and specific trucks. The advantages of the present trucking company tracking system are that the system requires independent drivers to return tickets to the trucking company in order to secure payment, prevents the drivers of independently owned trucks from duplicating and using fraudulent tickets, determines haul times for tracking productivity, tracks all trucks registered with the unique vehicle identification touch button, allows the trucking company to analyze each driver's productivity, and utilizes a universal database available for download from a web site.

Another embodiment of the present tracking system enables quarry owners to track construction materials leaving the site and quantify each customer's total volume each day. The advantages of the present quarry tracking system are that the system provides an efficient method of tracking construction materials that are leaving the quarry, provides detailed quantity analysis for customer billing, produces timely reports with extensive detail each day, eliminates keypunching ticket information into a computer each day, provides the ability to have inventory control on all materials leaving the quarry, and assists in quickly auditing billing from the same sub-contractors, thereby increasing accounting productivity.

It is therefore an object of the present invention to provide an improvement that overcomes the aforementioned inadequacies of the prior art and provide a significant contribution to the advancement of tracking vehicles that carry construction materials.

Another object of the present invention is to provide a method and means to use a tracking system that permits the automatic generation of reports and that queries the tracking records into a format that can be used. Exemplary formats are reports that detail when a vehicle arrived or left a designated area, summarize the total volume of construction material carried by a company or by a specific vehicle, or calculate the route time of the vehicle.

Another object of the present invention is to provide a tracking system that eliminates the need for tickets and create a tracking system that is substantially paperless.

Still another object of the present invention is to provide a method and means for using a tracking system that requires minimum training.

Yet another object of the present invention is to provide a method and means for using a tracking system that allows expansion to an unlimited number of scanning devices for use with the tracking system.

Both the foregoing general description and the following detailed description are explanatory and are not restrictive of the invention as claimed. The accompanying drawings, which are incorporated in and constitute part of the specification, illustrate embodiments of the present invention and together with the general description, serve to explain principles of the present invention.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 1 shows the elements of the present tracking system that includes the dual function scanner, vehicle identification means comprising a touch button, bar codes associated with a scan operator, bar codes associated with a job number and site input, bar codes associated with a type of construction material, and encrypted bar code load tickets.

FIG. 2 shows how the tracking system is implemented with the scan operator scanning the vehicle identification touch button, downloading the data through a base station to a host computer, and a printer used to print reports and invoices.

DETAILED DESCRIPTION

FIG. 1 shows the elements of the present tracking system that includes the dual function scanner 10, vehicle identification means comprising a touch button 20, bar codes associated with a scan operator 30, bar codes associated with a job number 40 and site input 50, bar codes associated with a type of construction material 60, and encrypted bar code load tickets 70.

Bar codes are used to identify primary information used in the tracking and auditing of vehicles carrying construction material. Primary information includes bar codes that identify the scan operator 30, the construction activity 50, the job number 40, and the type of construction material 60 being hauled.

Secondary information used in tracking vehicles includes a unique vehicle identification code 21 contained in a touch button 20, and a unique encrypted bar code 80 printed on a load ticket 70 that identifies a company and load ticket number.

FIG. 2 depicts base station 90 for downloading data from scanner 10, electronic conduit 100 for transferring data from base station 90 to computer 110, and printer 120.

In practicing the present invention, the primary information is first read by scanner 10. Scan operator 130 first confirms that scanner 10 is turned on by verifying that power light 11 is illuminated. Next, scan operator 130 depresses activation button 12 of bar code reader 13 while maintaining contact with the bar code and quickly swiping bar code reader 13 over the desired bar code in either a left to right, or right to left motion.

A valid scan and an electronically stored record of the desired bar code is indicated by a valid scan light 14 being illuminated on scanner 10. Each primary information variable must be entered before the scanner will accept the secondary information associated with the tracking of a vehicle. If incorrect primary or secondary information is read by the scanner, the incorrect information is removed by scanning a designated bar code for deleting the last entry 55.

FIG. 2 shows how scanner 10 is used and implemented in one embodiment of the contractor tracking system. In practicing the present invention, vehicle 160 begins a haul trip by being loaded with construction material 180 from quarry 140 and hauling material 180 to construction site 150. At the entrance to construction site 150, vehicle 160 stops and scan operator 130 scans the bar code 80 on load ticket 70. Scan operator 130 then contacts the unique vehicle identification touch button 20 affixed to the vehicle with touch button reader 15. LED display 22 shows vehicle identification code 21. Dual function scanner 10 now has an electronically stored record of the vehicle identification code 21. Moreover, bar coded load ticket information 80 is time and date stamped and stored electronically as a completed haul trip. Load ticket 70 is then given to the driver as a receipt of the haul trip. Vehicle 160 then proceeds to desired location 170 at construction site 150 and empties the construction materials 180.

Vehicle 160 begins another haul trip by returning to quarry 140 to pick up another load of construction material 180 and delivering material 180 to construction site 150 where scan operator 130 again scans load ticket 70 and contacts unique vehicle identification touch button 20. Completed hauling trips electronically stored by the tracking system continue for as many iterations as necessary for the construction project.

Scanner 10 downloads the electronically stored records of the hauling trips through base station 90 to host computer 110 at the end of the day or, at any desired time. Base station 90 can be used alone or linked together for multiple downloading of up to ten scanners 10. Base station 90 may be connected directly to computer 110 or to a modem (not shown) for data transfer from a remote location. Data can also be transmitted to an infrared transceiver built into computer 110 or printer 120, or to an external infrared transceiver that connects to the computer's serial port. Scanner 10 stamps the time and date of each electronically stored record so that the records can be correlated and queried to prepare invoices, produce reports, or identify potential fraud. The dual function scanner 10 used in the preferred embodiment is a Videx DuraTrax scanner that reads both bar codes and touch buttons 20.

The preferred embodiment for the unique vehicle identification means is a touch button 20. Touch button 20 includes a stainless steel disk with a computer memory chip sealed inside. The top of the button is bonded to a first point in the memory circuit, the container to a second point. When touch button reader 15 touches these two points, they establish a communication circuit. Each touch button 20 has a unique preprogrammed identification code and can be initialized with a variety of memory configurations. Touch buttons 20 are constructed to withstand moisture, radiation, and temperature extremes and are ideal for construction sites where paper bar code labels would not be durable. The touch button used for the vehicle identification means in the preferred embodiment is a Dallas Semiconductor ibutton®.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween. Now that the invention has been described,

What is claimed is:

1. A vehicle tracking and auditing system for tracking vehicles carrying construction materials, comprising:

a vehicle identification means adapted to be affixed to each vehicle of a plurality of vehicles so that each vehicle can be tracked;

a sensing means for reading the vehicle identification means and creating records;

an operator identifying means adapted to be read by the sensing means;

a construction activity identification means adapted to be read by the sensing means;

a job number identification means adapted to be read by the sensing means;

a construction material identification means adapted to be read by the sensing means;

a load ticket identification means adapted to be read by the sensing means;

a storing means for electronically storing records;

a downloading means so that the electronically stored records can be downloaded;

a computer means; and a report and invoice generating means for processing the downloaded data.

2. The vehicle tracking and auditing system of claim 1 wherein the vehicle identification means is a touch button that includes an identification code on a computer memory chip, the touch button being distinctively associated with a vehicle to be tracked and the touch button being read by the sensing means.

3. The vehicle tracking and auditing system of claim 1 wherein the operator identification means is a printed bar code.

4. The vehicle tracking and auditing system of claim 1 wherein the construction activity identification means is a printed bar code.

5. The vehicle tracking and auditing system of claim 1 wherein the job number identification means is a printed bar code.

6. The vehicle tracking and auditing system of claim 1 wherein the construction material identification means is a printed bar code.

7. The vehicle tracking and auditing system of claim 1 wherein the sensing means comprises a bar code scanner.

8. The sensing means of claim 7 wherein the sensing means further comprises a touch button scanner.

9. The vehicle tracking and auditing system of claim 1 wherein the downloading means includes a serial cable and wherein electronically stored records in the sensing means are downloaded to the computer means by the serial cable.

10. The vehicle tracking and auditing system of claim 1 wherein the downloading means comprises an infrared transceiver.

11. The vehicle tracking and auditing system of claim 1 wherein the downloaded data comprises electronically stored records of the time and date of when a touch button and load ticket were scanned.

12. A method of tracking and auditing vehicles carrying construction material, comprising the steps of:

providing a sensing means adapted to read information;

reading an operator identifier code that identifies an operator of the sensing means;

reading a loading identifier code and an unloading identifier code that identifies the construction material as being loaded or unloaded at a designated site;

reading a job number identifier code that identifies the job number for the designated site;

reading a construction material identifier code that identifies the type of the construction material;

affixing a vehicle identification means to a vehicle, providing the vehicle identification means with a unique preprogrammed identification code so that the vehicle can be identified by a unique alphanumeric sequence;

reading a load ticket identifier code;

reading a vehicle identification means;

creating records from the operator identifier code, the loading and unloading identifier code, the job number identifier code, and the construction material identifier code, the records including a time and date when the vehicle identification means and the load ticket identifier code were read;

electronically storing the records;

downloading the electronically stored records; and generating preselected reports by querying of the records.

13. The method as in claim 12, further comprising the step of:

identifying potentially fraudulent invoice amounts through a query of downloaded records.

* * * * *